(12) United States Patent
Chen

(10) Patent No.: US 12,739,489 B2
(45) Date of Patent: Sep. 15, 2026

(54) CAMERA DEVICE WITH A QUICK-RELEASE FUNCTION

(71) Applicant: VIVOTEK INC., New Taipei City (TW)

(72) Inventor: Wei-Hung Chen, New Taipei City (TW)

(73) Assignee: VIVOTEK INC., New Taipei City (TW)

( * ) Notice: Subject to any disclaimer, the term of this patent is extended or adjusted under 35 U.S.C. 154(b) by 56 days.

(21) Appl. No.: 18/902,965

(22) Filed: Oct. 1, 2024

(65) Prior Publication Data

US 2025/0113092 A1 Apr. 3, 2025

(30) Foreign Application Priority Data

Oct. 2, 2023 (TW) ................................ 112137626

(51) Int. Cl.
*H04N 23/55* (2023.01)
*H04N 23/52* (2023.01)

(52) U.S. Cl.
CPC ............ *H04N 23/55* (2023.01); *H04N 23/52* (2023.01)

(58) Field of Classification Search
CPC .............................. H04N 23/55; H04N 23/52
See application file for complete search history.

(56) References Cited

U.S. PATENT DOCUMENTS

2015/0021730 A1* 1/2015 Chen .................... H10F 39/804 257/432
2020/0003988 A1* 1/2020 Li ......................... H04N 23/54
2022/0014687 A1* 1/2022 Baltz ..................... H04N 23/63
2023/0092048 A1* 3/2023 Xu ........................ H04N 23/68 396/419
2024/0072504 A1* 2/2024 Brown .............. G02B 27/0988

FOREIGN PATENT DOCUMENTS

CN 109923849 A 6/2019
TW M571326 U 12/2018

* cited by examiner

*Primary Examiner* — Gevell V Selby
(74) *Attorney, Agent, or Firm* — Winston Hsu

(57) ABSTRACT

A camera device with a quick-release function includes a camera lens, a circuit board and a bridging module. The camera lens has an optical axis. The circuit board has an optical sensor aligning with the optical axis of the camera lens. The bridging module is used to assemble the camera lens with the circuit board. The bridging module includes a lens holder and a glue holder. The lens holder is used to hold the camera lens. The glue holder is detachably disposed on the circuit board, and can be adhered to the lens holder via glue so as to constrain a relative movement between the camera lens and the circuit board.

19 Claims, 5 Drawing Sheets

CAMERA DEVICE WITH A QUICK-RELEASE FUNCTION

BACKGROUND OF THE INVENTION

1. Field of the Invention

The present invention relates to a camera device, and more particularly, to a camera device with a quick-release function to avoid the circuit board and/or the camera lens from scrapping.

2. Description of the Prior Art

A conventional camera device installs the camera lens on the lens holder; when the optical sensor of the circuit board aligns with the optical axis of the camera lens, the UV curing glue is coated on the lens holder to tightly adhere to the circuit board, to prevent the optical sensor from being skewed relative to the optical axis of the camera lens. Generally, the UV curing glue added with light-sensitive substances is used to adhere the lens holder and the circuit board; when relative position of the lens holder and the circuit board is adjusted, the UV curing glue is irradiated by ultraviolet light to convert from a liquid state to a solid state, for producing a adhesion effect. However, if phase conversion of the UV curing glue is poor and the optical sensor is skewed relative to the optical axis of the camera lens, or the optical sensor is defocused due to change of the thermal expansion coefficient at high and low temperatures, the lens holder and the circuit board that are adhered to the UV curing glue need to discard, and the new lens holder and the new circuit board are used to recalibrate and realign. The circuit board has expensive cost; conventional assembly technology requires discarding the lens holder and the circuit board, which results in high cost and weak market competition of the camera device.

SUMMARY OF THE INVENTION

The present invention provides a camera device with a quick-release function to avoid the circuit board and/or the camera lens from scrapping for solving above drawbacks.

According to the claimed invention, a camera device with a quick-release function includes a camera lens, a circuit board and a bridging module. The camera lens has an optical axis. The circuit board includes an optical sensor aligning with the optical axis of the camera lens. The bridging module is adapted to assemble the camera lens with the circuit board. The bridging module includes a lens holder and a glue holder. The lens holder is adapted to hold the camera lens. The glue holder is detachably disposed on the circuit board, and adhered to the lens holder via glue, so as to constrain a relative movement between the camera lens and the circuit board.

According to the claimed invention, the lens holder includes a covering portion and a connecting portion. The connecting portion is extended from the covering portion outwardly, and is connected with the camera lens via a thread structure of the connecting portion. An undulating structure is disposed on a side of the covering portion opposite to the connecting portion. The UV curing glue is coated on the undulating structure to adhere the glue holder and the lens holder.

The camera device of the present invention can utilize the bridging module to assemble the camera lens with the circuit board. The bridging module can assemble the lens holder and the glue holder respectively with the camera lens and the circuit board; if the UV curing glue set between the lens holder and the glue holder has poor adhesion due to failed curing, the camera lens and the circuit board can be respectively disassembled from the lens holder and the glue holder, and the bridging module that is adhered to the lens holder and the glue holder via the poor UV curing glue can be discarded, so that the new set of the bridging module can be reassembled with the camera lens and the circuit board, for a purpose of rapid replacement and cost saving without scrapping of the circuit board and/or the camera lens.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
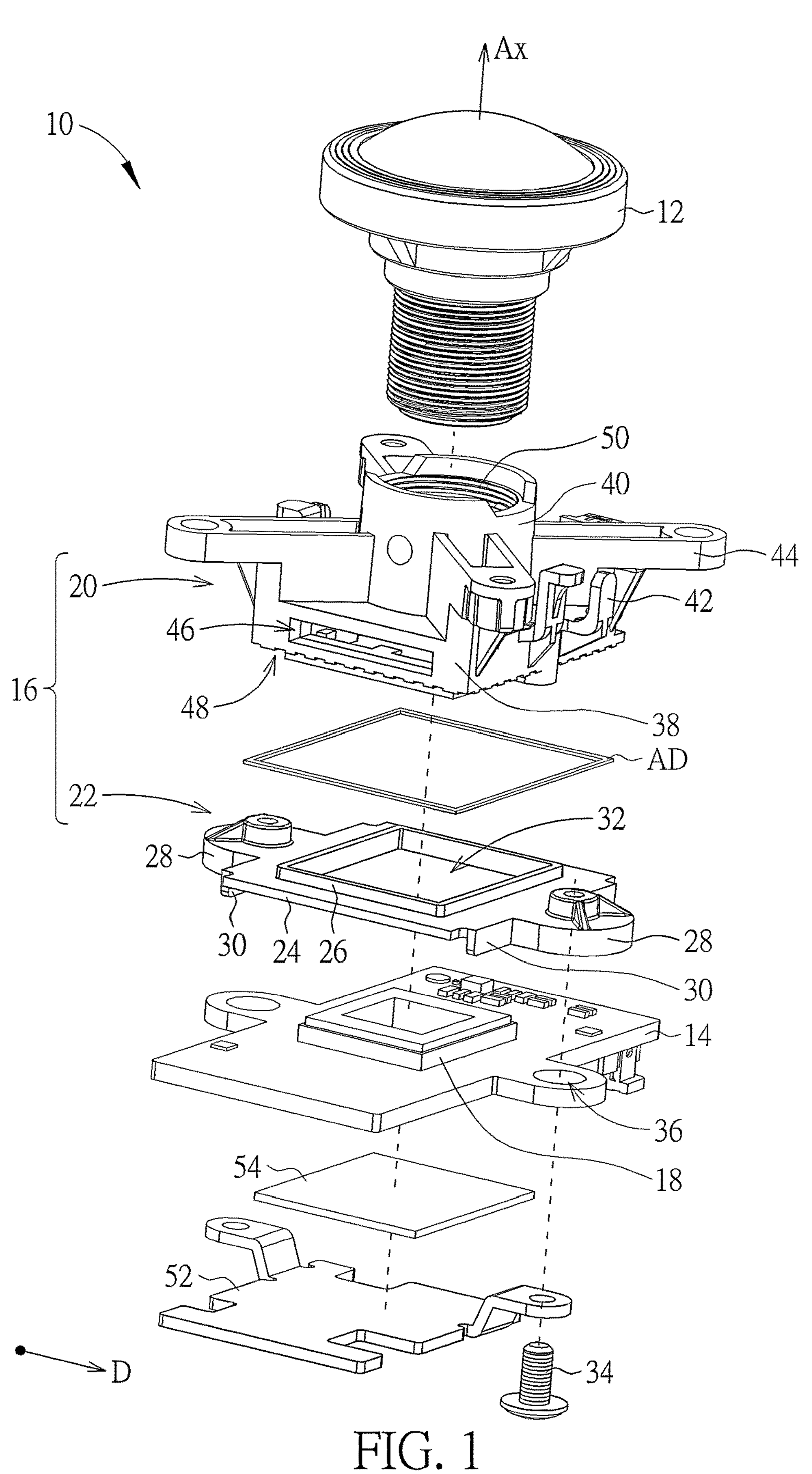
FIG. 1 is an exploded diagram of a camera device according to a first embodiment of the present invention.
Figure 2:
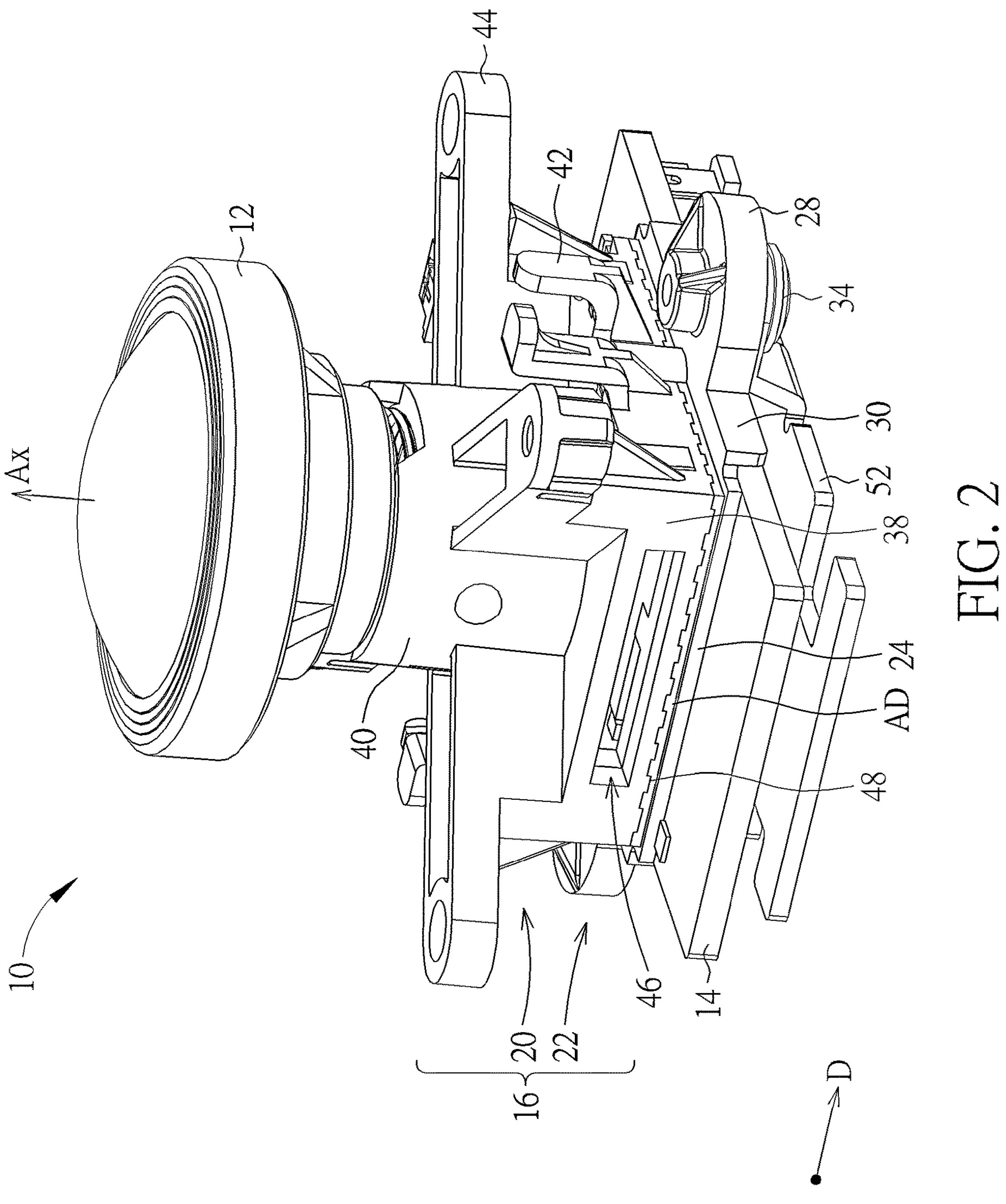
FIG. 2 is an assembly diagram of the camera device according to the first embodiment of the present invention.

Please refer to FIG. 1 and FIG. 2. FIG. 1 is an exploded diagram of a camera device 10 according to a first embodiment of the present invention. FIG. 2 is an assembly diagram of the camera device 10 according to the first embodiment of the present invention. The camera device 10 can include a camera lens 12, a circuit board 14 and a bridging module 16. The camera lens 12 can have an optical axis Ax. The camera lens 12 can be assembled with the circuit board 14 via the bridging module 16, and an optical sensor 18 of the circuit board 14 can align with the optical axis Ax of the camera lens 12. The bridging module 16 can provide two holders respectively assembled with the camera lens 12 and the circuit board 14, and the two holders can be fixed to each other via glue AD (e.g. UV curing glue). If an adhesion effect of the UV curing glue AD is poor, such as the optical sensor 18 not properly aligning with the optical axis Ax of the camera lens 12, the camera lens 12 and the circuit board 14 can be disassembled from the bridging module 16 rapidly, and the bridging module 16 can be discarded and replaced with another set of the new bridging module 16, so as to avoid the expensive circuit board 14 and/or the expensive camera lens 12 from scrapping.

The bridging module 16 can include a lens holder 20 and a glue holder 22. The lens holder 20 can be used to hold the camera lens 12. The glue holder 22 can be detachably disposed on the circuit board 14, such as screw locking or structural engagement. The glue holder 22 can be adhered to the lens holder 20 via the UV curing glue AD, so as to constrain a relative movement between the camera lens 12 and the circuit board 14, and further to ensure that the optical sensor 18 can accurately align with the optical axis Ax of the camera lens 12. If the optical sensor 18 does not accurately align with the optical axis Ax, the camera lens 12 can be disassembled from the lens holder 20, and the circuit board 14 can be disassembled from the glue holder 22; the bridging module 16 that is removed can be directly discarded, and the camera lens 12 and the circuit board 14 can be respectively assembled with the lens holder 20 and the glue holder 22 of another set of the bridging module 16. When the optical sensor 18 accurately aligns with the optical axis Ax, the UV curing glue AD can be used to adhere the lens holder 20 and the glue holder 22 for constraining the relative movement between the camera lens 12 and the circuit board 14.

A detailed structure of the bridge module 16 can be further described as following. The glue holder 22 can optionally include a base portion 24, a reinforcing portion 26, a locking portion 28 and a constraining portion 30. The base portion 24 can have a hole 32 used to accommodate the optical sensor 18. The reinforcing portion 26 can be disposed around the hole 32, and used to increase structural strength of the base portion 24. The locking portion 28 can be disposed on a side or plural sides of the base portion 24. A number and position of the locking portion 28 can depend on a design demand. The bridging module 16 can utilize a fixing component 34 to insert into the locking portion 28 for connecting a keyhole 36 of the circuit board 14. The constraining portion 30 can be disposed on lateral of the base portion 24, and used to abut against an edge of the circuit board 14, which means a distance between inner walls of two or more than two constraining portions 30 can be equal to a board size of the circuit board 14, so as to constrain slide of the circuit board 14 in a specific direction D and further to enhance the structural strength of the glue holder 22.

The lens holder 20 can optionally include a covering portion 38, a connecting portion 40, a cable management portion 42, a positioning portion 44, a grooved portion 46 and an undulating structure 48. The covering portion 38 can be used to cover the reinforcing portion 26 and the hole 32 of the glue holder 22, and the optical sensor 18 of the circuit board 14, to prevent an optical signal received by the optical sensor 18 through camera lens 12 from being interfered by ambient light. The connecting portion 40 can be extended from the covering portion 38 outwardly, and can be connected with the camera lens 12 via a thread structure 50. Generally, the thread structure 50 can be an inner thread structure, and an outer thread structure can be formed on a case of the camera lens 12; practical application of the thread structure 50 is not limited to the foresaid embodiment. The cable management portion 42 can be disposed on an outer side of the covering portion 38, and used to arrange cables of the camera lens 12. In the present invention, the cable management portion 42 can be designed as two L-type structural elements placed facing each other to provide storage space for the cables; practical application of the cable management portion 42 can have various embodiments, and a detailed description is omitted herein for simplicity.

The positioning portion 44 can be disposed on and protrude from a lateral side of the covering portion 38, and used to connect with the case (which is not shown in the figures) of the camera device 10. A number and orientation of the positioning portion 44 can be varied in accordance with inner space configuration of the camera device 10, and other variation is omitted herein for simplicity. The undulating structure 48 can be disposed on a side of the covering portion 38 opposite to the connecting portion 40, and can align with an area on the base portion 24 of the glue holder 22 that is around the hole 32. The UV curing glue AD can be coated on the undulating structure 48 to be adhered to the base portion 24 of the glue holder 22. The undulating structure 48 can be various regular or irregular rough or jagged structures, which has a purpose to increase adhesion strength of the UV curing glue AD by increase of a contact area. The grooved portion 46 can be formed on position of the covering portion 38 located between the undulating structure 48 and the connecting portion 40, and used to arrange an optical component, such as a filter; a type of the optical component can depend on an actual demand of the camera device 10.

As the first embodiment shown in FIG. 1 and FIG. 2, the camera device 10 can install the glue holder 22 on an upper surface of the circuit board 14 where on the optical sensor 18 is disposed. The undulating structure 48 of the lens holder 20 can be adhered to an upper surface of the glue holder 22 opposite to the circuit board 14 via the UV curing glue AD; that is to say, the first embodiment can install the glue holder 22 between the lens holder 20 and the circuit board 14. In addition, the camera device 10 can optionally include a heat dissipating element 52 disposed on a lower surface of the circuit board 14 and used to position a thermal conduction element 54 at position closely attached to a heat generation source (such as the optical sensor 18, an operation processor, or other electronic components) of the circuit board 14 for preferred heat dissipation efficiency.

Figure 3:
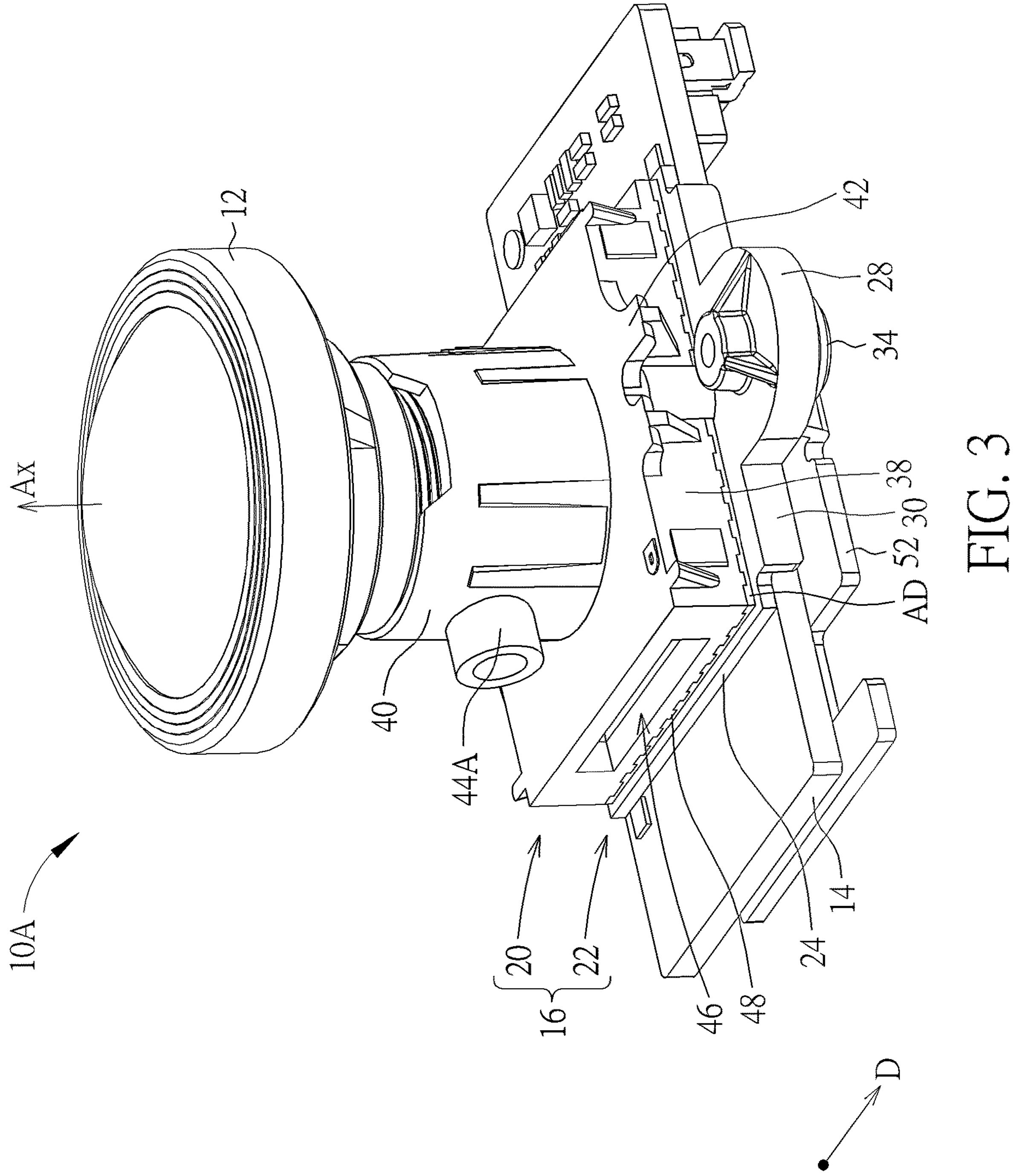
FIG. 3 is an assembly diagram of the camera device according to a second embodiment of the present invention.

Please refer to FIG. 3. FIG. 3 is an assembly diagram of the camera device 10A according to a second embodiment of the present invention. In the second embodiment, elements having the same numerals as ones of the first embodiment have the same structures and functions, and the detailed description is omitted herein for simplicity. The camera device 10A can install the positioning portion 44A on an outer wall of the connecting portion 40 for connecting the case (which is not shown in the figures) of the camera device 10. According to structural design of the first embodiment and the second embodiment, a shape and a number and position of the positioning portion 44 (or the positioning portion 44A) are not limited to the specific form. Any structures that can fix the camera lens 12 inside the case of the camera device 10 via the lens holder 20 of the bridging module 16, and further fix the glue holder 22 and the circuit board 14 on the lens holder 20 via the UV curing glue AD can conform to a design scope of the present invention.

Figure 4:
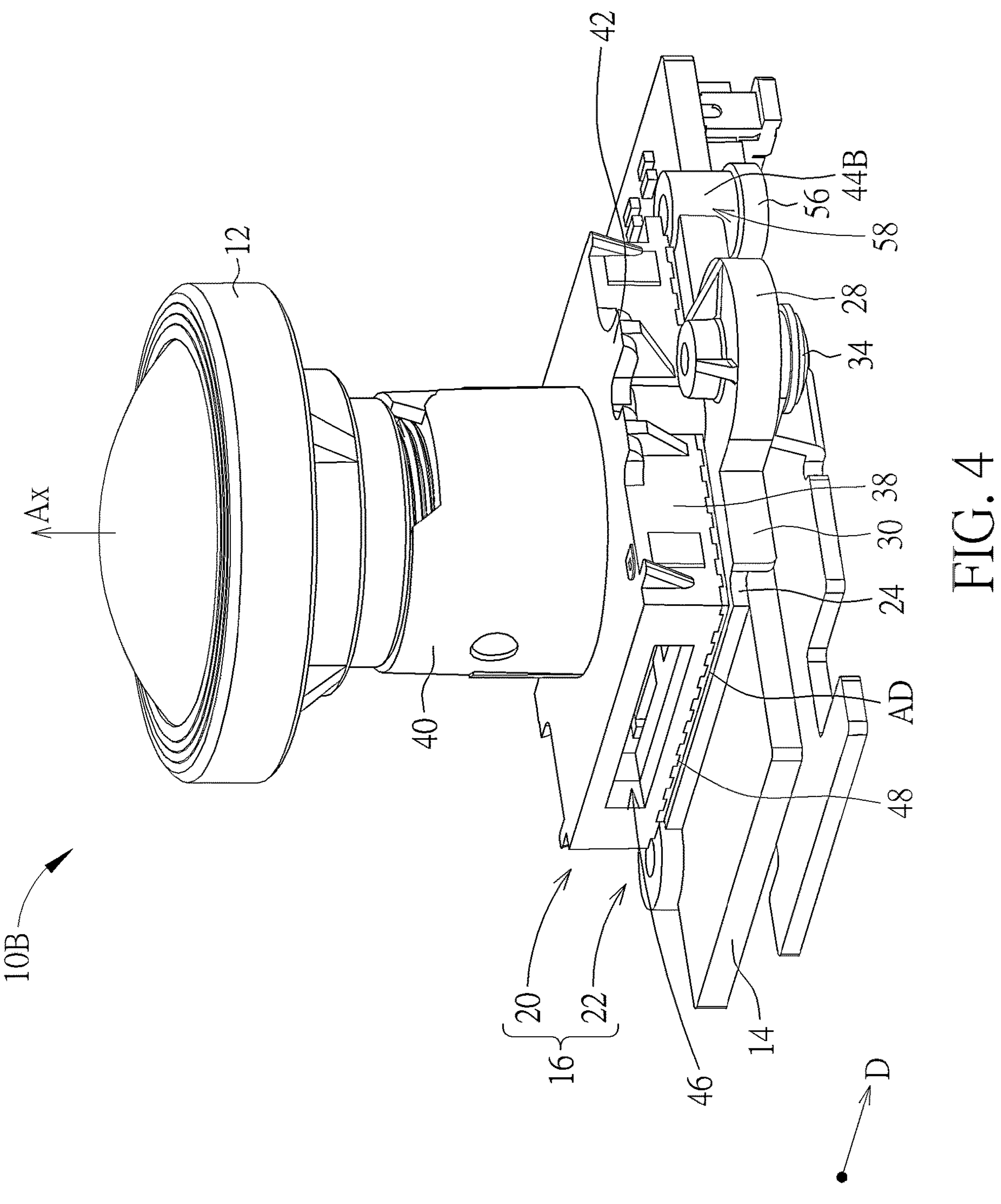
FIG. 4 is an assembly diagram of the camera device according to a third embodiment of the present invention.

Please refer to FIG. 4. FIG. 4 is an assembly diagram of the camera device 10B according to a third embodiment of the present invention. In the third embodiment, elements having the same numerals as ones of the foresaid embodiments have the same structures and functions, and the detailed description is omitted herein for simplicity. The positioning portion 44B of the camera device 10B can be disposed on the lateral side of the covering portion 38 where on the undulating structure 48 is disposed, and can be extended downwardly to pass through a perforation 58 on the circuit board 14 when the lens holder 20 is assembled with the glue holder 22. Besides, the bridging module 16 can optionally include a constraint element 56 used to dispose on an end of the positioning portion 44B that passes through the circuit board 14. The constraint element 56 can be a nut or a similar element; any element that can be engaged with the end of the positioning portion 44B to prevent the positioning portion 44B from being separated from the perforation 58 of the circuit board 14 can conform to the design scope of the constraint element 56 in the present invention.

Therefore, the glue holder 22 of the third embodiment can utilize the fixing component 34 to pass through the locking portion 28 and the keyhole 36 (which is hid inside the glue holder 22 shown in FIG. 4) for being assembled with the circuit board 14. When the optical sensor 18 (which is hid inside the lens holder 20 shown in FIG. 4) is adjusted to align with the optical axis Ax of the camera lens 12, the lens holder 20 can be adhered to the glue holder 22 via the UV curing glue AD, and the lens holder 20 can further utilize assembly of the positioning portion 44B and the constraint element 56 to constrain its motion relative to the circuit board 14. If the optical sensor 18 does not accurately align with the camera lens 12, the constraint element 56 and the fixing component 34 can be disassembled, and the lens holder 20 and the glue holder 22 can be separated from the circuit board 14, so that the camera lens 12 can be disassembled from the lens holder 20 to discard the bridging module 16; then, another bridging module 16 can be used to realign the optical sensor 18 with the camera lens 12, adhere the lens holder 20 to the glue holder 22 via the UV curing glue AD, and assemble the constraint element 56 with the fixing component 34 for complete assembly.

Figure 5:
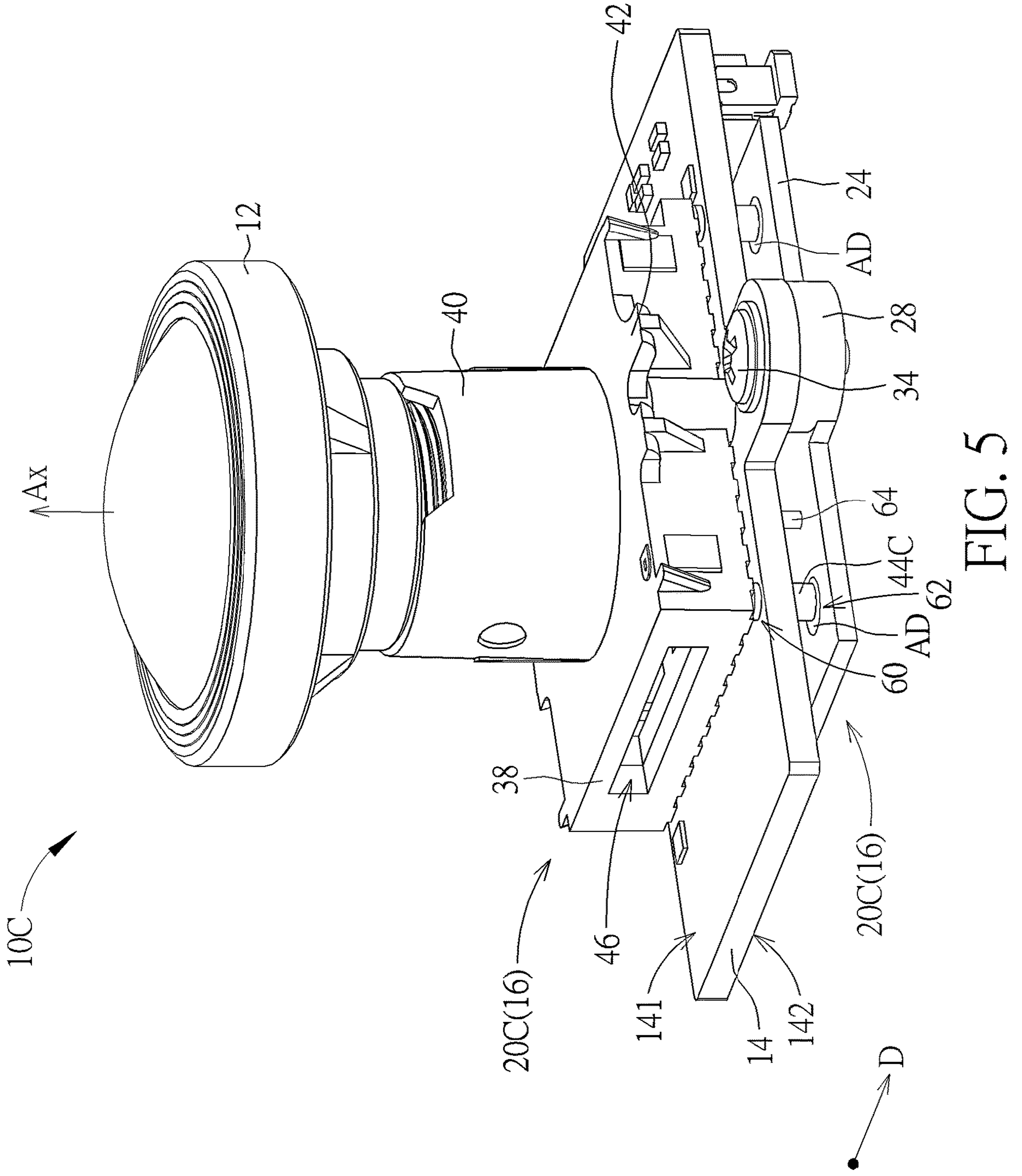
FIG. 5 is an assembly diagram of the camera device according to a fourth embodiment of the present invention.

Please refer to FIG. 5. FIG. 5 is an assembly diagram of the camera device 10C according to a fourth embodiment of the present invention. In the fourth embodiment, elements having the same numerals as ones of the foresaid embodiments have the same structures and functions, and the detailed description is omitted herein for simplicity. The lens holder 20C of the camera device 10C can be disposed on a first surface 141 of the circuit board 14, and the glue holder 22C can be disposed on a second surface 142 of the circuit board 14. The first surface 141 and the second surface 142 can be respectively located on two opposite sides of the circuit board 14; therefore, the fourth embodiment can dispose the circuit board 14 between the lens holder 20C and the glue holder 22C.

As shown in FIG. 5, the positioning portion 44C of the lens holder 20C can be disposed on the side of the covering portion 38 opposite to the connecting portion 40. The positioning portion 44C can sequentially pass through an opening 60 on the circuit board 14 and an opening 62 on the glue holder 22C, and the UV curing glue AD (which is sheltered by the circuit board 14 shown in FIG. 5) can be coated on the end of the positioning portion 44C that passes through the circuit board 14 and the glue holder 22C, which means the lens holder 20C and the glue holder 22C in the fourth embodiment are still adhered to each other via the UV curing glue AD. Moreover, the glue holder 22C can preferably include an abutting portion 64 disposed on an upper surface of the base portion 24 facing the circuit board 14. The abutting portion 64 can abut against a lower surface of the circuit board 14, and used to avoid an unexpected relative movement between the circuit board 14 and the glue holder 22C. The abutting portion 64 can be made of hard material or soft material, and a shape of the abutting portion 64 is not limited to the embodiment shown in the figures.

In conclusion, the camera device of the present invention can utilize the bridging module to assemble the camera lens with the circuit board. The bridging module can assemble the lens holder and the glue holder respectively with the camera lens and the circuit board; if the UV curing glue set between the lens holder and the glue holder has poor adhesion due to failed curing, the camera lens and the circuit board can be respectively disassembled from the lens holder and the glue holder, and the bridging module that is adhered to the lens holder and the glue holder via the poor UV curing glue can be discarded, so that the new set of the bridging module can be reassembled with the camera lens and the circuit board, for a purpose of rapid replacement and cost saving without scrapping of the circuit board and/or the camera lens.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A camera device with a quick-release function, the camera device comprising:

a camera lens having an optical axis;

a circuit board comprising an optical sensor aligning with the optical axis of the camera lens;

a bridging module adapted to assemble the camera lens with the circuit board, the bridging module comprising:

a lens holder adapted to hold the camera lens; and a glue holder detachably disposed on the circuit board, and adhered to the lens holder via glue, so as to constrain a relative movement between the camera lens and the circuit board; and a thermal conduction element attached to the circuit board.

2. The camera device of claim 1, wherein the glue holder comprises a base portion and a reinforcing portion, a hole is formed on the base portion and adapted to accommodate the optical sensor, the reinforcing portion is disposed around the hole on the base portion.

3. The camera device of claim 2, wherein the glue holder further comprises a locking portion disposed on a side of the base portion, the bridging module utilizes a fixing component to insert into the locking portion for connecting the circuit board.

4. The camera device of claim 2, wherein the glue holder further comprises a constraining portion disposed on a side of the base portion, and adapted to abut against an edge of the circuit board.

5. The camera device of claim 1, wherein the lens holder comprises a covering portion and a connecting portion, the connecting portion is extended from the covering portion outwardly, and is connected with the camera lens via a thread structure of the connecting portion.

6. The camera device of claim 5, wherein the lens holder further comprises a cable management portion disposed on an outer side of the covering portion, and adapted to arrange cables of the camera lens.

7. The camera device of claim 5, wherein an undulating structure is disposed on a side of the covering portion opposite to the connecting portion, the lens holder further comprises a grooved portion formed on position of the covering portion that is between the undulating structure and the connecting portion, and adapted to arrange an optical component.

8. The camera device of claim 5, wherein the lens holder further comprises a positioning portion disposed on a side of the covering portion, and adapted to connect with a case of the camera device.

9. The camera device of claim 7, wherein the glue holder is disposed on a surface of the circuit board where on the optical sensor is disposed, the undulating structure of the lens holder is adhered to a surface of the glue holder opposite to the circuit board via the glue.

10. The camera device of claim 7, wherein the further comprises a positioning portion disposed on the side of the covering portion where on the undulating structure is disposed, the positioning portion passes through the circuit board, the bridging module further utilizes a constraint element to engage with an end of the positioning portion that passes through the circuit board.

11. The camera device of claim 1, wherein the lens holder is disposed on a first surface of the circuit board, the glue holder is disposed on a second surface of the circuit board, the first surface and the second surface are respectively located on two opposite sides of the circuit board, the circuit board is located between the lens holder and the glue holder.

12. The camera device of claim 11, wherein the glue holder comprises an abutting portion adapted to abut against the circuit board for constraining the relative movement.

13. The camera device of claim 1, wherein the camera device further comprises a heat dissipating element disposed on a lower surface of the circuit board, and adapted to position the thermal conduction element on the circuit board.

14. The camera device of claim 5, wherein the lens holder further comprises a positioning portion disposed on an outer wall of the connecting portion.

15. The camera device of claim 10, wherein the positioning portion is extended downwardly to pass through a perforation on the circuit board.

16. The camera device of claim 5, wherein the lens holder further comprises a positioning portion disposed on a side of the covering portion opposite to the connecting portion.

17. The camera device of claim 16, wherein the positioning portion passes through an opening on the circuit board and an opening on the glue holder, and is fixed to the glue holder via the glue.

18. A camera device with a quick-release function, the camera device comprising:

a camera lens having an optical axis;

a circuit board comprising an optical sensor aligning with the optical axis of the camera lens; and a bridging module adapted to assemble the camera lens with the circuit board, the bridging module comprising:

a lens holder adapted to hold the camera lens; and a glue holder detachably disposed on the circuit board, and adhered to the lens holder via glue, so as to constrain a relative movement between the camera lens and the circuit board, the glue holder comprising a base portion and a locking portion, the locking portion being disposed on a side of the base portion, the bridging module utilizing a fixing component to insert into the locking portion for connecting the circuit board.

19. A camera device with a quick-release function, the camera device comprising:

a camera lens having an optical axis;

a circuit board comprising an optical sensor aligning with the optical axis of the camera lens; and a bridging module adapted to assemble the camera lens with the circuit board, the bridging module comprising:

a lens holder adapted to hold the camera lens; and a glue holder detachably disposed on the circuit board, and adhered to the lens holder via glue, so as to constrain a relative movement between the camera lens and the circuit board, the glue holder comprising a base portion and a constraining portion, the constraining portion being disposed on a side of the base portion, and adapted to abut against an edge of the circuit board.

* * * * *